UNITED STATES PATENT OFFICE.

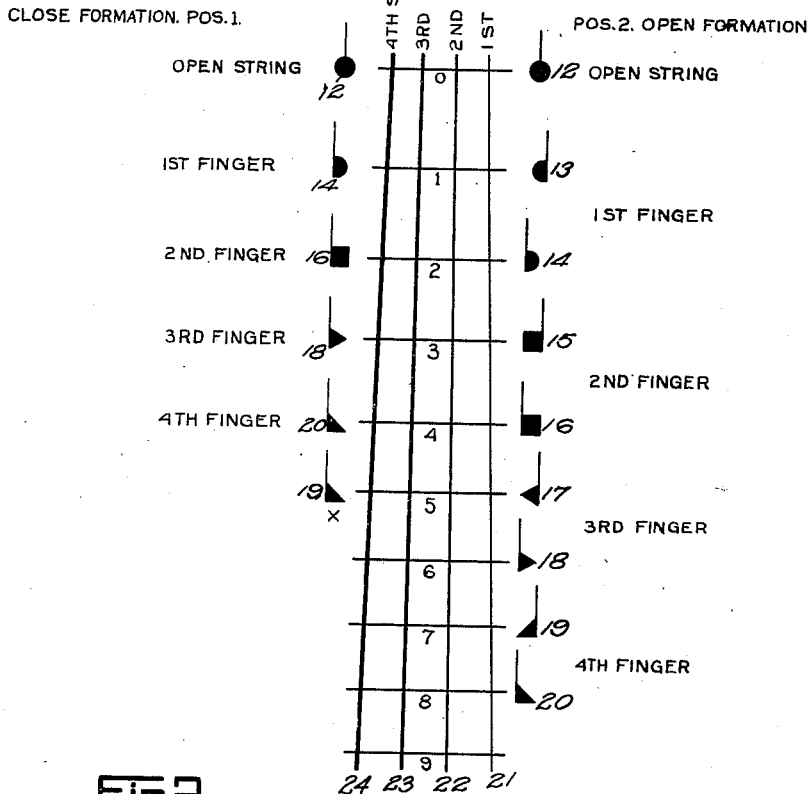

HENRY KINNEY, OF YUMA, ARIZONA.

MUSICAL NOTATION.

1,200,367.  Specification of Letters Patent.  Patented Oct. 3, 1916.

Application filed July 15, 1915. Serial No. 39,995.

*To all whom it may concern:*

Be it known that I, HENRY KINNEY, a citizen of the United States, and a resident of Yuma, in the county of Yuma and State of Arizona, have invented a new and Improved Musical Notation, of which the following is a full, clear, and exact description.

The object of the invention is to provide a new and improved musical notation, more especially designed for use with stringed instruments such as a violin, mandolin, guitar, viola, violoncello, banjo and the like, and arranged to represent the fingering for producing the desired pitch by indicating which of the strings of the instrument is to be played, by which finger, and the point at which the finger is to be placed on the string.

In order to accomplish the desired result, use is made of a staff having spaced lines to provide spaces representing the strings of the instrument and notes having heads of various shapes for indicating the fingers of the hand used for fingering the strings, the positions of the notes on the staff lines indicating the positions relative to the frets of the finger board.

A practical embodiment of the invention is represented in the accompanying drawings forming a part of this specification, in which similar characters of reference indicate corresponding parts in all the views.

Figure 4:
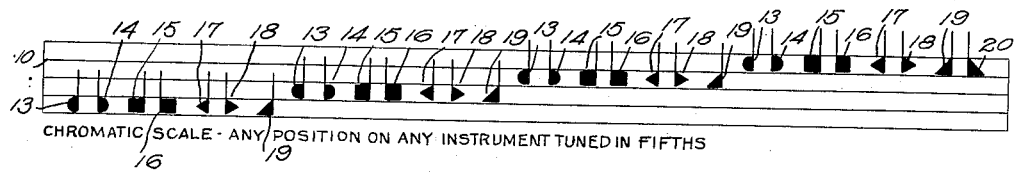
Figure 5:
Figure 6:

Figure 1 is a diagrammatic view of the strings and finger board of a musical instrument and the notes used in the notation; Fig. 2 shows staff lines and the notes placed thereon for what I term open formation, as hereinafter explained. Fig. 3 is a similar view of the same with the notes in close formation; Fig. 4 shows a chromatic scale of the improved musical notation for any instrument tuned in fifths; Fig. 5 is an example of the notation for playing "America" on a violin or mandolin in G or on a viola or violoncello in C; and Fig. 6 is an example of the musical notation including grace notes and other modifying marks.

The notation consists essentially of a staff having spaced lines 10 to provide a number of spaces between the lines corresponding to the number of strings used on the instrument for which the music is written; thus, as shown in Fig. 2, four such spaces are provided for the music to be played on a violin, mandolin, viola or violoncello, or six spaces, as shown in Fig. 3, for the music to be played on a guitar.

A series of notes 12, 13, 14, 15, 16, 17, 18, 19 and 20 are provided and placed in the spaces between the staff lines. The note 12 represents an open string and the notes 13 14, 15 16, 17 18, 19 20, correspond to the first, second, third and fourth fingers of the hand used for fingering the strings 21, 22, 23 and 24 of the four-stringed instrument represented in Fig. 1. Each of the notes 12 to 20 consists of a head and a stem, of which the note 12 has its head in the form of a circle extending on opposite sides of its stem and this note is for an open string, as shown in Fig. 1. The heads of the notes 13 and 14 for the first finger are in the form of a semicircle, the heads of the notes 15, 16 for the second finger are in the form of a square, the heads of the notes 17 and 18 for the third finger are in the form of a triangle, while the heads of the notes 19 and 20 for the fourth finger are in the form of the half of a square. The placing of the finger on the string to be sounded depends, first, upon the position in which the music is to be played *i. e.* whether in the normal position or in advanced position, as explained later; second, upon whether the fingers are being used in open or close formation; and, third, whether the note shows the finger in its natural or in its half step position. The heads of the notes 14, 16, 18 and 20 are turned to the right of their stems thus indicating that the finger is to be placed on the string in its natural position. The heads of the notes 13, 15, 17 and 19 point to the left of their stems thus indicating that the finger is to be placed on the string in its half step position, which is always one fret or semitone nearer the open string than its natural position.

The fingers are said to be in close formation when the natural positions of the fingers are assumed to be one fret or semitone apart, and the fingers are in open formation when the natural positions of the fingers are assumed to be two frets or semitones apart. As a general rule, the fingers will be used in open position on all instruments tuned in fifths or greater, and in close formation on all instruments tuned in fourths or less. Advanced positions are made uniform for all stringed instruments, being based upon the normal position of the first finger: for example, in the first position the normal position of the first finger is at the first fret or a semitone from the open string, and in the second position the normal position of the first finger is at the second fret or two semitones from the open string, etc., as will be readily understood by reference to Fig. 1. It is sometimes convenient, if not absolutely necessary, to place the finger on the string in another than its regular position. For this purpose use is made of a cross, "X" mark 21, which, placed near a note, indicates that the finger is to be placed on the string one fret or semitone from its regular position, the finger being placed higher or lower than the said fret, according to the position of the head of the note on its stem, that is, whether the head is turned to the left or to the right, as above explained.

It is understood that an instrument is regularly tuned when each string is separated from the next adjacent string by the same regular interval; such as a fifth, fourth, third, etc., the examples being the violin, mandolin, viola, violoncello, bass, etc. An instrument is tuned dissimilarly when the interval between some of the adjacent strings is more or less than it is between other adjacent strings of the same instrument, as, for example, the guitar, banjo, etc. Instruments are similarly tuned when the interval between the strings of one instrument is the same as the interval between the corresponding strings of the other instrument, as, for instance, the violin, mandolin, viola and violoncello which are all tuned similarly to each other, namely, in fifths. Irregularly tuned instruments may be similarly tuned. Instruments are tuned in unison when the open string of one instrument is tuned to the same pitch as the corresponding open string of the other, as, for example, the violin and mandolin, which are tuned in unison with each other. Music written for any instrument may be played upon any other instrument tuned similar to the one for which the music is written, and the fingering shown will be correct; but the music produced may be in a different key, or an octave higher or lower, depending upon the difference in pitch between the strings of the instrument for which the music is written, and the corresponding strings of the instrument used in playing.

Music written for an advanced position may be played in any position, either on the instrument for which it is written or on any other instrument similarly tuned, but the music produced may be in a different key, etc., depending upon the position used and also upon the difference in pitch between the strings of the instruments.

The first position may be considered an advanced position provided the open strings are not used. Music written for an advanced position may be played in any key or octave desired, within the limits of the instrument used, by shifting the fingers to the proper position on the finger-board to produce the desired key.

When a composition requires the use of, say, two adjacent strings of any regularly tuned instrument, it may be played on any two adjacent strings of that instrument, or on any two adjacent strings of any other instrument tuned similar to the one for which the music is written. If the music is written for an advanced position, it may be played in any position on any two adjacent strings of any instrument tuned similar to the instrument for which the music is written, but the music produced may be in a different key or octave, depending upon the original key, position and pitch of the strings for which the music is written.

Of course, pieces to be played by two or more instruments, may be written the same as in ordinary music, by writing a separate score for each instrument. However, a single score can generally be played by two instruments similarly tuned provided the secondary instruments are tuned a fifth, or an octave below the primary one; or, when not so tuned, the fingers can sometimes be shifted to such other string or position as will produce an interval of a fifth, or an octave, between the primary and secondary instruments. To illustrate: Suppose we have a score that requires the use of the first three strings of the violin; it may be played on two violins by using the same fingering on the second violin that is used on the first violin, only using the second, third and fourth strings of the second violin instead of the first, second and third, as shown in the solo. Every note produced upon the second violin will be a perfect fifth below the notes simultaneously produced upon the first violin, therefore, the instruments will harmonize perfectly at all times. Any violin score may be played on violin, viola and violoncello, by using the same strings, fingering and position on all three instruments simultaneously.

Grace notes, etc., are handled about the same as in ordinary music except, of course, the fingering is shown, as indicated in Fig. 6.

From the foregoing it will be seen that in writing music according to the notation described, full use may be made of the usual embellishments, ornaments, and signs of expression the same as in ordinary music. Many features which are troublesome especially to beginners, such as keys, sharps and flats, are eliminated.

It will also be noticed that within certain limits, depending principally on the instruments used, the music is self-transposing, first from one key to another, second, from one position to another, third, from one instrument to another, and, fourth, from one string to another string of the same instrument, showing the correct fingering in all cases.

According to the notation described, a solo is playable as a solo, duet, trio, etc., on the proper instruments either in the key and position in which the music is written or in any other key or position desired, the original solo showing the correct fingering on all the instruments in any key or position.

By the arrangement described fingerboard charts or marks of any kind on the fingerboard of the instruments are dispensed with. Time and similar expressions are represented exactly the same as in ordinary notations. Pitch is not indicated at all but instead the fingering necessary to produce the pitch is indicated.

Having thus described my invention, I claim as new and desire to secure by Letters Patent:

1. A musical notation for stringed instruments, comprising a staff having spaced lines the spaces between the lines representing the strings of the instruments, notes in the spaces of the staff, each note having a head and a stem, the heads of the notes being of various shapes indicating the fingers used for fingering said strings, the position of the heads on the staff indicating the strings to be fingered, and a modifying mark associated with one of the notes to indicate an abnormal or irregular position of a finger on said string.

2. A musical notation for stringed instruments, comprising a staff having spaced lines the spaces between the lines representing the strings of the instruments, notes in the spaces of the staff, each note having a head and a stem, the heads of the notes being of various shapes indicating the fingers used for fingering said strings, the position of the heads on the staff indicating the strings to be fingered, and a modifying mark associated with one of the notes to indicate a position of the finger distant from the regular or normal one for the note.

3. A musical notation for stringed instruments, comprising a staff having spaced lines the spaces between the lines representing the strings of the instrument, notes in the spaces of the staff, each note having a head and a stem, the heads of the notes being of various shapes indicating the fingers used for fingering said strings, the position of the heads on the staff indicating the strings to be fingered, sundry of the notes having their heads extending sidewise from the stem in one direction and sundry of the notes having their heads extending sidewise in the opposite direction, and a modifying mark associated with one of the notes to indicate a position of the finger on the string other than the regular or normal position and higher or lower according to the direction in which the head of the note is pointing.

4. A musical notation for stringed instruments, comprising a staff having spaced lines, the spaces between the lines representing strings of the instruments, notes in the spaces of the staff, said notes being of different shapes, each shape designating a finger used on the strings, each note being provided with a stem and head and the position of the head with respect to the stem designating sharps or flats, and means associated with one of the notes for indicating the position of the finger on the string distant from the position indicated by the shape of the note.

In testimony whereof I have signed my name to this specification in the presence of two subscribing witnesses.

HENRY KINNEY.

Witnesses:
CHAS. OLCESTER,
R. H. STANTON.